3,198,833
1-(TRIFLUOROMETHYLPHENYL) - 2 - LOWER-ALKYL AMINOPROPANES AND ACID ADDITION SALTS THEREOF
Laszlo G. Beregi, Boulogne, Pierre J. Hugon, Rueil-Malmaison, Jean-Claude R. Le Douarec, Versailles, and Henri Lucien Schmitt, Paris, France, assignors to Societe en nom collectif dite: Science-Union & Compagnie-Societe Francaise de Recherches Medicales, Suresnes, France, a French society
No Drawing. Filed Nov. 1, 1961, Ser. No. 149,190
Claims priority, application Monaco, Nov. 5, 1960, 269; application France, Apr. 4, 1961, 857,671; July 4, 1961, 866,962
4 Claims. (Cl. 260—570.8)

This invention relates to novel compositions of matter comprising fluorinated amines, and methods of preparing same. These compositions have been found to possess valuable anorectic properties.

The novel compounds of the invention have the general formula:

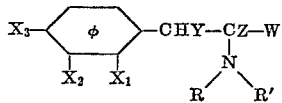

where each of the X symbols may represent a substituent selected from within the group consisting of a hydrogen atom, a fluorine atom and a trifluoromethyl radical —$CF_3$, Y and Z may each represent a substituent from within the group consisting of a hydrogen atom and the methyl radical —$CH_3$, W is a substituent from within the group consisting of the methyl radical —$CH_3$ and trifluoromethyl radical —$CF_3$, and R and R' are jointly taken from within the group consisting of two monovalent hydrocarbon radicals $C_nH_{2n+1}$ ($n$ from 0 to 5) and the heterocyclic piperidine and pyrrolidine residues.

The novel compounds are derived from the benzene derivatives of Formula A below. These benzene compounds will hereinafter for the sake of typographic clarity be represented by the simplified symbol indicated at B:

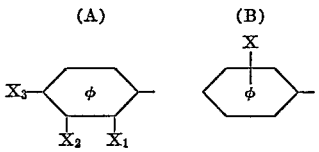

wherein the X substituents are already situated at the same positions as those they are to occupy in the amine to be prepared.

The primary amines in which $R=R_2=H$, $Y=Z=H$ and $W=CH_3$, may be prepared by any one of a number of different processes now to be described.

In a first process, the starting material comprises appropriately substituted benzyl cyanide, this is converted first to the correspondingly substituted 1-phenyl 1-cyano acetone, then to the corresponding benzyl-methylketone, and then into an oxime, which finally is reduced to the desired amine. The process is diagrammed as follows:

DIAGRAM 1

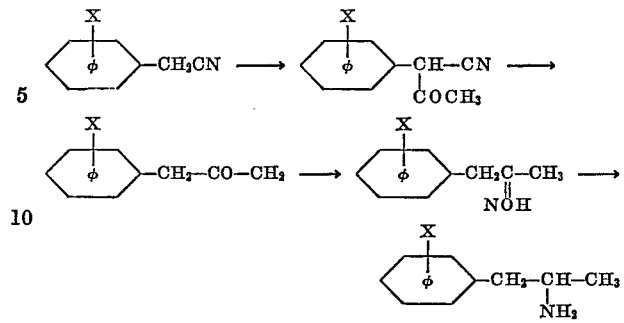

In a second process, the appropriately substituted benzyl cyanide is hydrolyzed into the corresponding phenylacetic acid, this is converted to the substituted methylketone benzyl, then to the oxime which is reduced, all in accordance with the following diagram:

DIAGRAM 2

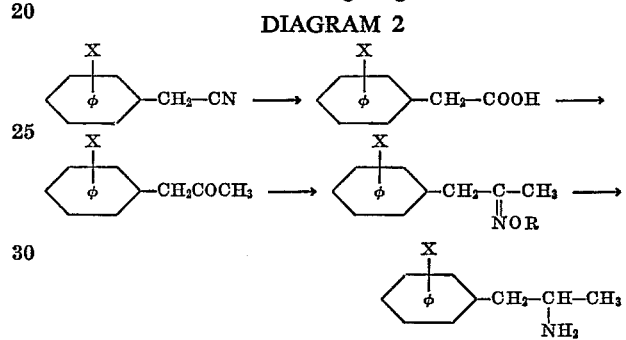

Another alternative process comprises converting the substituted benzaldehyde into the corresponding 1-phenyl 2-nitro 1-propene and this is reduced to amine as in the following diagram:

DIAGRAM 3

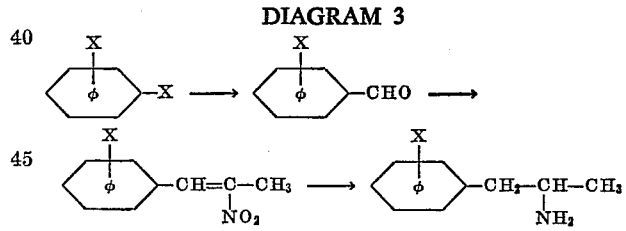

In another process, an appropriately substituted 1-phenyl 2-propanol is oxidized into ketone, this is converted to the oxime, and the oxime reduced to the amine, as shown by the following diagram:

DIAGRAM 4

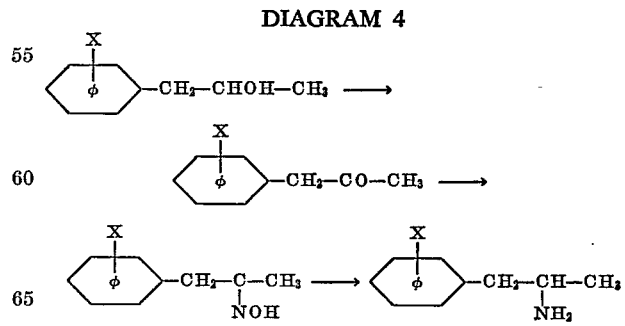

The primary amines in which R=R'=Z=H and Y=W=CH₃ are prepared from the appropriately substituted bromobenzenes by converting them first to the corresponding 2-phenyl 2-butanol, then to the corresponding 2-phenyl 3-bromobutane. This is hydrolyzed to the correspondingly substituted 2-phenyl 3-butanone, which is converted to the oxime then to the corresponding amine, as shown in the following diagram:

DIAGRAM 5

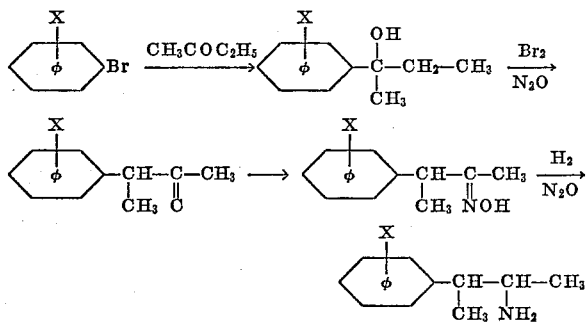

The primary amines wherein R=R'=Y=H and Z=W=CH₃ are prepared from the appropriate substituted benzyl bromide, which is first converted to the corresponding 1-phenyl 2-methyl 2-propanol, then to the substituted 1-phenyl 2-methyl 2-formylaminopropane. The latter is hydrolyzed to produce the substituted 1-phenyl 2-methyl 2-aminopropane. The process is diagrammed below:

DIAGRAM 6

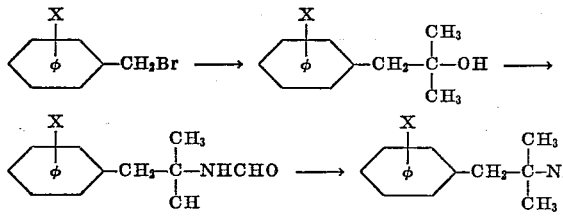

The primary amines wherein R=R'=Y=Z=H and W=CF₃ are obtained from the appropriately substituted benzyl cyanide by reaction with ethyl trifluoroacetate. The resulting compound, after hydrolysis and oximation, is reduced to the corresponding 1-phenyl 2-amino 3,3,3-trifluoropropane. The process goes as follows:

DIAGRAM 7

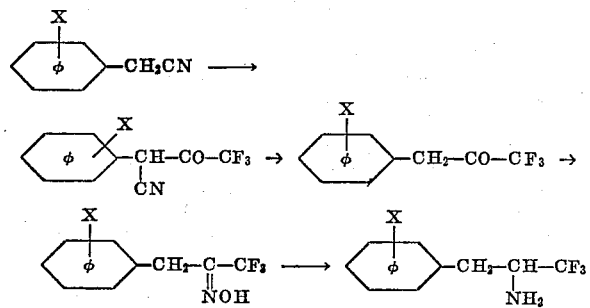

The secondary amines where R=H, R'=alkyl, and the tertiary amines where R=R'=alkyl are obtained by a reducing alkylation from the corresponding alkyl-aryl-ketone, or from the primary amine.

The amino compounds provided according to the invention are strong bases capable of forming additive compounds with inorganic and organic acids.

Among the acids able to form such addition compounds, the following may be particularly mentioned: the hydrohalic acids, sulfuric acid, phosphoric acid, nitric acid, perchloric acid, aliphatic, alicyclic, aromatic and heterocyclic sulfonic and carboxyl acids including formic acid, acetic acid, propionic acid, oxalic acid, succinic acid, glycolic acid, lactic acid, maleic acid, tartric acid, benzene sulfonic acid, phenylacetic acid, benzoic acid, p- aminobenzoic acid, toluene-sulfonic acid, naphthalene-sulfonic acid, sulfanilic acid, tannic acid, alginic acid.

The novel amines are further capable of reacting with quaternizing agents such as alkyl halides for example, to provide methyl bromide, ethyl iodide, n-butyl chloride, dialkyl sulfates such as dimethyl-sulfate, and aralkyl halides such as benzyl bromide and quaternary ammonium salts.

All of the compounds thus obtainable by the invention include an asymmetric carbon and are capable of being split into two optical isomers by means of campho-sulfonic acid, tartaric acid, maleic acid, benzoyl-tartaric acid and the like.

The preparation of a few of these compounds according to the invention will be described by way of example.

The first five examples all relate to the preparation of primary amines and the last five deal with that of secondary and tertiary amines.

The melting points as tested with Kofler blocks, and the boiling points at the pressure used in the test, are indicated for each compound in Celsius degrees.

*Example 1*

In the preparation of 1-(2'-fluoro phenyl) 2-methyl 2-amino propane from 1-bromomethyl 2-fluorobenzene, the following procedure was used.

16 parts 1-(2'-fluoro phenyl) 2-formylaminopropane dissolved in 100 parts 85% ethyl alcohol were heated in the presence of concentrated hydrochloric acid at reflux during 5 hours. After concentration nearly to a dry state, the residue was taken up with 200 parts water, washed with 100 parts ether, then the aqueous layer was alkalized with 10 parts solium hydroxide in wafers. The base was extracted twice with 100 parts ether each time. The ether solutions were washed with 50 parts water, dried with potassium carbonate and distilled, and yielded 11.5 parts of a substance characterized by B.P. 87° C. at 12.5 mm. Hg, $n_D^{25}=1.4960$.

The hydrochloride, recrystallized from a mixture of isopropyl alcohol and anhydrous ether, melts at 193–195° C.

34 parts 1-(2'-fluoro phenyl) 2-methyl propanol were reacted in the presence 11.1 parts sodium cyanide with 50.2 parts acetic acid and 50 parts concentrated sulfuric acid to yield 31 parts 1-(2'-fluoro phenyl) 2-formylaminopropane (B.P. 124–125° C. at 1 mm. Hg, $n_D^{25}=1.5162$.

34 parts 1-(2'-fluoro phenyl) 2-methyl propanol were obtained in a Grignard type reaction from 54 parts 1-bromomethyl 2-fluorobenzene and 16.7 parts acetone (B.P. 96–97° C., $n_D^{25}=1.4983$).

By a similar process the following were prepared:

1-(3'-fluoro phenyl) 2-methyl 2-aminopropane (B.P. 94° C. at 15 mm. Hg, $n_D^{25}=1.4936$), and the hydrochloride, M.P. 210° C. (acetone).

1-(3'-trifluoromethyl phenyl) 2-methyl 2-aminopropane, B.P. 86–87° C. at 9 mm. Hg, $n_D^{25}=1.4568$ and the hydrochloride M.P. 212° C. (ethyl acetate).

1-(4'-fluoro phenyl) 2-methyl 2-aminopropane, B.P. 82–83° C., $n_D^{25}=1.4922$) and the hydrochloride, M.P. 187° C. (ethyl acetate).

1-(4'-trifluoromethyl phenyl) 2-aminopropane, B.P. 49–50° C. at 0.6 mm. Hg and the hydrochloride, M.P. 208–210 C. (acetone).

*Example 2*

1-(4'-fluoro phenyl) 3,3,3-trifluoro 2-aminopropane was prepared by the following procedure.

8 parts 1-(4'-fluoro phenyl) 3,3,3-trifluoro 2-oximino propane were reduced under conditions similar to Example 1. 5.5 parts 1-(4'-fluoro phenyl) 3,3,3-trifluoro 2-aminopropane were obtained, B.P. 90–91 C. at 14 mm., $n_D^{25}=1.4491$.

The hydrochloride, recrystallized from a mixture of absolute alcohol and anhydrous ether, melts at 210° C. (sublimation occurs).

The oxime was prepared by the usual technique, B.P. 76° C. at 0.7 mm., $n_D^{25}=1.4615$.

1-(4'-fluoro phenyl) 3,3,3-trifluoro 2-propanone was obtained by reacting 1-(4'-fluoro phenyl) 1-cyano 3,3,3-trifluoro propanone with 80% sulfuric acid at 160–170° C., B.P. 74–77° C. at 17 mm., $n_D^{25}=1.4308$.

The 1-(4'-fluoro phenyl) 1-cyano 3,3,3-trifluoro 2-propanone was obtained from ethyl trifluoro acetate and p-fluorobenzyl, M.P. 96° C., in a mixture of chloroform and petroleum ether.

*Example 3*

1-(4'-fluoro phenyl) 2-dimethylaminopropane was prepared by reacting 11.8 parts 40% formol with 13.5 parts 90% formic acid and 8 parts 1-(4'-fluoro phenyl) 2-aminopropane (prepared by the method of Suter and Weston, J. Am. Chem. Soc., 63, 602 (1941) ), at 90° C. during 6 hours, then acidified with 4 N HCl. Yield 9 parts. B.P. 93–94° C. at 16 mm. The hydrochloride was also prepared, M.P. 158–160° C.

The following compounds were also prepared by a similar method:

1-(3'-trifluoromethyl phenyl) 2-dimethylaminopropane, B.P. 99–100° C. at 12.5 mm., and the hydrochloride, M.P. 169–170° C.

1-(4'-fluoro phenyl) 2-methyl 2-dimethylaminopropane, B.P. 104° C. at 10 mm., and the hydrochloride, M.P. 218° C.

*Example 4*

1-(4'-fluoro phenyl) ethyl 2-aminopropane was prepared by the following method.

8 parts 1-(4'-fluoro phenyl) 2-aminopropane were hydrogenated in the presence of 30 parts Raney nickel, 6 parts acetaldehyde and 150 parts ethyl alcohol.

After completion of the reaction the catalyst was separated by filtering. There were added to the filtrate 100 parts 4 N hydrochloric acid and the reaction mixture was concentrated in a vacuum. The concentrate was extracted with 100 parts ether and alkalized with wafers of sodium hydroxide.

The base was extracted with ether and distilled.

The 1-(4'-fluoro phenyl) 2-ethylaminopropane, tilting 98%, had a boiling point of 100–102° C. at 16 mm. Hg. The yield was 6 parts.

To obtain the hydrochloride, 5 parts of the base were dissolved in 10 parts absolute ethanol, and there was added the theoretical quantity of 5 N hydrochloric ether, then 100 parts ether were added at elevated temperature. There were obtained 3.5 parts hydrochloride melting at 154–156° C.

The following compounds were prepared by similar methods:

1-(2'-fluoro phenyl) 2-ethylaminopropane (B.P. 98–102° C. at 12.5 mm.), and the hydrochloride, M.P. 149–151° C.

1-(4'-fluoro phenyl) 2-butylaminopropane (B.P. 83–88° C. at 0.8 mm.), and the hydrochloride (M.P. 193–194° C.).

*Example 5*

To 10.65 parts acetic anhydride there were added, with cooling, 8 parts 1-(4'-trifluoromethyl phenyl) 2-aminopropane and 100 parts water. The mixture was neutralized with 30 parts soda carbonate. The organic layer was extracted twice with 50 parts ether. The ether solutions were washed with 25 parts water and dried over potassium carbonate. On distillation there were obtained 9 parts 1-(4'-trifluoromethyl phenyl) 2-acetylaminopropane (B.P. 156–158° C. at 2.5 mm.), M.P. 88° C. (cyclohexane).

9 parts of the last prepared compound were reduced in solution in 100 parts ether with 1.7 parts lithium and aluminium hydride with 20 parts ether. The suspension was heated to reflux for 4 hours, hydrolyzed with 2 parts water, 2 parts 4 N sodium hydroxide and then 6 parts water. The precipitate was drained, washed with 50 parts ether, the filtrate was extracted twice with 50 parts ½ N sulfuric solution. The acidic layers were separated by sedimentation and neutralized with 100 parts 4 N sodium hydroxide, the separated amine was extracted with 200 parts ether. There were obtained 6 parts 1 - (4' - trifluoromethyl phenyl) 2-ethyl-aminopropane (B.P. 109–112° C. at 18 mm.). The hydrochloride was recrystallized from acetone (M.P. 202° C.).

1-(3'-trifluoromethyl phenyl) 2-ethylaminopropane, prepared under similar conditions, has a boiling point 108–112° C. at 12 mm. The hydrochloride thereof was recrystallized from a mixture of ethyl alcohol and ether (M.P. 166° C.).

*Example 6*

1-(4'-fluoro phenyl) 2-methyl 2-methylaminopropane was prepared by the following method:

9.7 parts 1-(4'-fluoro phenyl) 2-methyl 2-formylaminopropane were dissolved in 110 parts anhydrous ether were reduced with 2.35 parts lithium-aluminium hydride. The mixture was held at reflux for 4 hours, and hydrolyzed with 2.7 parts water and 2.7 parts 4 N sodium hydroxide, then 5.4 parts water. After draining, the ether filtrate was extracted with 100 parts N sulfuric acid. The acidic solution was alkalized with 3 parts 4 N soda solution, the base was extracted twice with 50 parts ether. The ether solution was washed with 20 parts water, dried over sodium sulfate, concentrated and distilled. The yield was 6 parts (B.P. 96–96.5° C. at 10 mm., $n_D^{25}=1.4928$).

The hydrochloride was recrystallized from a mixture of cyclohexane and ether (M.P. 136° C.).

A similar method was used to prepare the following:

1-(3-trifluoromethyl phenyl) 2-methyl 2-methylaminopropane (B.P. 96–97.5° C. at 10 mm., $n_D^{25}=1.4595$), and the hydrochloride, M.P. 137° C. from ethyl ether acetate.

*Example 7*

The cyclic tertiary amines (pyrrolidine and piperidine) were prepared from the corresponding primary amine, by reaction with 1,4-dibromobutane for pyrrolidine, and with 1,5-dibromopentane for piperidine.

There were obtained 3.5 parts 1-(4'-fluoro phenyl) 2-methyl 2-piperidine propane (B.P. 142–145° C. at 10 mm., $n_D^{25}=1.5103$), from 8.5 parts 1-(4'-fluoro phenyl) 2-methyl 2-aminopropane heated at reflux for 4 hours, with 11.15 parts 1,5-dibromopentane and 2.3 parts sodium acetate, by the procedure described by Kipriavov and Frenkel, Ukrain. Khim. Zhurnal, 16, No. 6, 620 (1950).

The corresponding hydrochloride, recrystallized from isopropyl alcohol, has a melting point 260° C.

A similar method was used in preparing the following:

1-(2'-fluoro phenyl) 2-piperidinopropane (B.P. 136–136.5° C. at 12.5 mm.), and the hydrochloride (M.P. 219–221° C.) from isopropyl alcohol.

1-(4'-fluoro phenyl) 2-methyl 2-pyrrolidinopropane (B.P. 137–140° C. at 10 mm., $n_D^{25}=1.5096$), and the hydrochloride (M.P. 209° C.) from acetone.

1-(3'-fluoro phenyl) 2-pyrrolidinopropane (B.P. 128–130° C. at 12.5 mm.), and the hydrochloride (M.P. 166–167° C.) from isopropyl alcohol and ether.

The novel compounds prepared according to the invention and some examples of which are given above, possess a variety of useful properties in many applications. Some are effective mordant agents usable in the textile dying industries, others act as corrosion inhibitors. Probably the major field of application of the novel compounds is in pharmacy, where many of the compounds have been found to exhibit powerful anorectic and/or sedative activity.

PHARMACOLOGY

A general summary of the pharmacological characteristics of the novel compounds of the invention is given in the appended Table III. The following is a brief description of the principal tests that have led to the determination of those characteristics.

Toxicity

The toxicity of the compounds was determined by the method of Lichtfield and Wilcoxon on the mouse. It was found that LD 50, on I.P. application, ranged from 41.55 to 439 mg./kg. depending on the compound.

Anorectic properties

These properties were investigated in the rat after a fast of 17 hours; in the rat after a fast of 30 hours; in the dog.

In the rat, the activity was found to range from 5 to 40 mg./kg.

1 - (3' - trifluoromethyl phenyl) 2-ethylaminopropane when given in a dose of 5 mg./kg. to the male rat and 3.2 mg./kg. to the female, reduces food intake by 50% for two hours.

Similar results are observed with the dog. Thus 1-(3'-trifluoromethyl phenyl) 2-ethylaminopropane in a dose of 5 mg./kg. reduces food intake by 85% with respect to the controls during the first six hours of the test.

Action on the central nervous system

The activity of the compounds of the invention on the central nervous system was investigated in mice by means of the electronic actograph ("trembling cage" test), the climbing test, the inclined-plane test, and observation of spontaneous activity in the mouse.

The study showed that the majority of the novel compounds when taken in the active dose of 10 to 40 mg./kg. (I.P. application) induce no motor hyperactivity. Most of the compounds in fact reduce the spontaneous activity of the mouse to a more or less great extent, and some of them even counteract the excitant activity of amphetamine.

Action on the cardio-vascular system

The action of the compounds on the cardio-vascular system was investigated in the marrow-less, atropined rat in a dose of 0.1 to 2 mg./kg. Most of the compounds only exert a very mild hypertensive activity. Thus for example, 1-(3'-trifluoromethyl phenyl) 2-ethylaminopropane, in a dose of 1 mg./kg. given intravenously, shows ten times less hypertensive activity than amphetamine. The said compound, given to a cat or a dog, anaesthetized with a chloralose-urethane mixture at a dose of 1 mg./kg. (I.V.), induces an increase in arterial tension of from 10 to 20 mm. Hg with bradycardia. At a dose of 5 mg./kg., it induces definite hypotension and inhibits the hypertension that would be otherwise produced by an excitation of the hypothalamic and bulbar pressure areas.

CONCLUSIONS

It can be definitely stated that most of the novel compounds of the invention possess a remarkably high anorectic activity. Most of them are free from any excitory activity at the anorectically active doses, and some in fact exert a definite sedative action.

They are likewise inactive on the cardio-vascular system at the anorectically-active doses, and the safety margin present between the anorectically-active doses and the doses liable to modify arterial tension is very broad.

Thus the novel compounds may be successfully used in human therapy in the treatment of obesity as appetite-inhibitors, without displaying the drawbacks of conventional drugs used for the purpose. When given to human patients at a dose of 15 to 30 mg. per diem, as tablets, 1-(3'-trifluoromethyl phenyl) 2-ethylaminopropane, reduces the appetite to a very large extent, enables a diet of strong calorific restriction to be easily followed, and results in an average loss of weight of from 5 to 12 kg. over a 2 or 3 months' cure. The drug may be readily given at any time even before the evening meal without producing insomnia, nervous excitation or hypertension.

The following tables serve to summarize the main characteristics of the novel compounds of the invention.

TABLE I

No.
8------1-4'-fluoro phenyl) 2-methyl 2-aminopropane
9------1-(3'-fluoro phenyl) 2-methyl 2-aminopropane
10------1-(3'-trifluoromethyl) phenyl 2-methyl 2-aminopane
11------1-(2'-fluoro phenyl) 2-methyl 2-aminopropane
12------1-(4'-fluoro phenyl) 3,3,3-trifluoro 2-aminopropane
13------1-(2'-4'-difluoro phenyl) 2-aminopropane
14------1-(3'-trifluoromethyl 4'-fluoro phenyl) 2-aminopropane
18------1-(4'-trifluoromethyl phenyl) 2-ethylaminopropane
20------1-(3'-trifluoromethyl phenyl) 2-dimethylaminopropane
21------1-(3'-trifluoromethyl phenyl) 2-ethylaminopropane
24------1-(4'-fluoro phenyl) 2-methyl 2-methylaminopropane
25------1-(4'-fluoro phenyl) 2-methyl 2-dimethylaminopropane
26------1-(4'-fluoro phenyl) 2-methyl 2-pyrrolidinopropane
27------1(4'-fluoro phenyl) 2-methyl 2-piperidinopropane
28------1-(3'-trifluoromethyl phenyl) 2-methyl 2-methylaminopropane

TABLE II

| No. | $X_3$ | $X_2$ | $X_1$ | Y | Z | W | $R^1$ | R | Boiling point of base at— °C. | mm. Hg. | Melting point of hydrochlor °C. |
|---|---|---|---|---|---|---|---|---|---|---|---|
| 8 | F | H | H | H | $CH_3$ | $CH_3$ | H | H | 82–83 | 9 | 187 |
| 9 | H | F | H | H | $CH_3$ | $CH_3$ | H | H | 94 | 15 | 210 |
| 10 | H | $CF_3$ | H | H | $CH_3$ | $CH_3$ | H | H | 86–87 | 9 | 212 |
| 11 | H | H | F | H | $CH_3$ | $CH_3$ | H | H | 87 | 12.5 | 193–195 |
| 12 | F | H | H | H | H | $CF_3$ | H | H | 90–91 | 14 | [1] 212 |
| 13 | F | H | F | H | H | $CH_3$ | H | H | 83–84 | 12 | 170, 171 |
| 14 | F | $CF_3$ | H | H | H | $CH_3$ | H | H | 87–88 | 13 | 177–179 |
| 18 | $CF_3$ | H | H | H | $CH_3$ | H | H | $C_2H_5$ | 109–112 | 18 | 202 |
| 20 | H | $CF_3$ | H | H | $CH_3$ | $CH_3$ | $CH_3$ | $CH_3$ | 99–100 | 12.5 | 169–170 |
| 21 | H | $CF_3$ | H | H | $CH_3$ | $CH_3$ | H | $C_2H_5$ | 108–112 | 12 | 166 |
| 24 | F | H | H | H | $CH_3$ | $CH_3$ | H | $CH_3$ | 96–96,5 | 10 | 136 |
| 25 | F | H | H | H | $CH_3$ | $CH_3$ | $CH_3$ | $CH_3$ | 104 | 10 | 218 |
| 26 | F | H | H | H | $CH_3$ | $CH_3$ | pyrrolidine | | 137–140 | 10 | 209 |
| 27 | F | H | H | H | $CH_3$ | $CH_3$ | piperidine | | 142–145 | 10 | [1] 260 |
| 28 | H | $CF_3$ | H | H | $CH_3$ | $CH_3$ | H | $CH_3$ | 96–97,5 | 10 | 137 |

[1] (Subl.)

TABLE III

| No. | Toxicity LD 50 (I.P.) | Motor hyperactivity Mouse, mg./kg. | | Anorexia Rat, mg./kg. | | Tensional activity Rat |
|---|---|---|---|---|---|---|
| 8 | 106.2 | 0 | 20 | +++ | 10 | 0.25 |
| 9 | 122.3 | 0 | 20 | +++ | 10 | 0.25 |
| 10 | 127.5 | 0 | 20 | + | 20 | 0.33 |
| 11 | 167.6 | 0 | 30 | +++ | 20 | 0.1 |
| 12 | 439 | 0 | 30 | 0 | 30 | 0 |
| 13 | 62 | + | 10 | +++ | 10 | 1 |
| 14 | 73.6 | 0 | 10 | +++ | 5 | 1 |
| 18 | 194.5 | 0 | 40 | +++ | 20 | 0 |
| 20 | 144 | 0 | 20 | +++ | 20 | 0.1 |
| 21 | 144 | 0 | 10 | +++ | 15 | 0.1 |
| 24 | 163.3 | 0 | 30 | +++ | 15 | 0.5 |
| 25 | 84.5 | 0 | 20 | + | 20 | 0.025 |
| 26 | 80.8 | 0 | 20 | ++ | 20 | 0.025 |
| 27 | 130.2 | 0 | 20 | 0 | 20 | 0.1 |
| 28 | 129 | 0 | 30 | ++ | 20 | 0.025 |

What we claim is:
1. A compound selected from the group consisting of (a) 1 - (trifluoromethylphenyl) - 2-lower-alkylaminopropanes of the formula

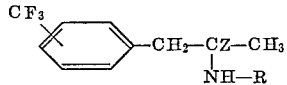

wherein Z is selected from the group consisting of hydrogen and methyl and wherein R is a lower-alkyl radical having up to a maximum of five carbon atoms, and (b) pharmaceutically acceptable acid addition salts thereof.

2. 1-(4'-trifluoromethyl phenyl) 2-ethylaminopropane.
3. 1-(3'-trifluoromethyl phenyl) 2-ethylaminopropane.
4. 1-(3'-trifluoromethyl phenyl) 2-methyl 2-methylaminopropane.

References Cited by the Examiner

UNITED STATES PATENTS

| | | | |
|---|---|---|---|
| 2,441,069 | 5/48 | Hoffmann et al. | 260—293 |
| 2,441,518 | 5/48 | Suter et al. | 260—570.8 |
| 2,711,428 | 6/55 | Goodson et al. | 260—293 |
| 3,078,307 | 2/63 | Craig et al. | 260—570.8 |

FOREIGN PATENTS

| | | |
|---|---|---|
| 851,660 | 10/60 | Great Britain. |
| 870,541 | 6/61 | Great Britain. |

OTHER REFERENCES

Patrick, Jr., et al.: Journal of the American Society, vol. 68, page 1010 (1946).

Suter et al.: Journal of the American Chemical Society, volume 63, pages 603 and 604 (1941).

Migrdichion Organic Synthesis (textbook), vol. I, page 473, (1957).

Noller: Chemistry of Organic Compounds (textbook), second edition; page 246 (1957).

CHARLES B. PARKER, *Primary Examiner.*

IRVING MARCUS, NICHOLAS S. RIZZO, *Examiners.*

UNITED STATES PATENT OFFICE
CERTIFICATE OF CORRECTION

Patent No. 3,198,833                                              August 3, 1965

Laszlo G. Beregi et al.

It is hereby certified that error appears in the above numbered patent requiring correction and that the said Letters Patent should read as corrected below.

Column 1, line 57, for "R=R$_2$=H" read -- R=R′=H --;

column 2, DIAGRAM 1, about line 8, for "-CH$_2$-CO-CH$_2$" read -- -CH$_2$-CO-CH$_3$ --; column 3, DIAGRAM 5, about line 17, for

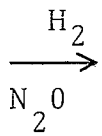          read          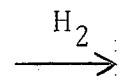

DIAGRAM 6, about line 41, for

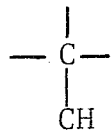          read          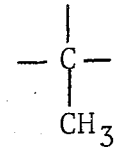

column 5, line 2, for "210° C." read -- 212° C. --; column 6, line 6, for "50 parts" read -- 150 parts --; column 8, line 30, for "1-4′-" read -- 1-(4′- --; line 33, for "pane" read -- propane --.

Signed and sealed this 19th day of April 1966.

(SEAL)
Attest:

ERNEST W. SWIDER                                    EDWARD J. BRENNER
Attesting Officer                                    Commissioner of Patents